US008075005B1

(12) United States Patent
Ryshavy et al.

(10) Patent No.: US 8,075,005 B1
(45) Date of Patent: Dec. 13, 2011

(54) WHEEL ALIGNMENT APPARATUS

(75) Inventors: John W. Ryshavy, Wayzata, MN (US);
James R. Ryshavy, Eden Prairie, MN (US)

(73) Assignee: Stempf Automotive Industries, Inc., Minnetonka, MN (US)

( * ) Notice: Subject to any disclaimer, the term of this patent is extended or adjusted under 35 U.S.C. 154(b) by 255 days.

(21) Appl. No.: 12/574,353

(22) Filed: Oct. 6, 2009

Related U.S. Application Data

(60) Provisional application No. 61/103,072, filed on Oct. 6, 2008.

(51) Int. Cl.
*B62D 17/00* (2006.01)

(52) U.S. Cl. .............................. 280/86.756; 280/86.754

(58) Field of Classification Search ............... 280/86.75, 280/86.751, 86.753, 86.754, 86.756
See application file for complete search history.

(56) References Cited

U.S. PATENT DOCUMENTS

| | | | | |
|---|---|---|---|---|
| 3,124,370 A * | 3/1964 | Traugott | ................... | 280/86.756 |
| 3,163,441 A * | 12/1964 | Traugott | ................... | 280/86.753 |
| 3,880,444 A * | 4/1975 | Bridges | ................... | 280/86.753 |
| 4,400,007 A * | 8/1983 | Ingalls | ................... | 280/86.756 |
| 4,420,272 A * | 12/1983 | Ingalls et al. | ................... | 403/4 |
| 4,641,853 A * | 2/1987 | Specktor et al. | ................... | 280/86.756 |
| 4,836,574 A * | 6/1989 | Ingalls | ................... | 280/86.756 |
| 4,921,271 A * | 5/1990 | Berry et al. | ................... | 280/86.756 |
| 5,044,659 A * | 9/1991 | Specktor et al. | ................... | 280/86.753 |
| 5,060,962 A * | 10/1991 | McWethy | ................... | 280/304.1 |
| 5,201,898 A * | 4/1993 | Pierce | ................... | 280/86.75 |
| 6,109,575 A * | 8/2000 | Munson | ................... | 248/200 |
| 6,503,039 B2 * | 1/2003 | Ward | ................... | 411/427 |
| 7,278,648 B2 * | 10/2007 | Bobbitt et al. | ................... | 280/86.751 |
| 7,331,589 B2 * | 2/2008 | Ingalls et al. | ................... | 280/86.756 |
| 7,568,711 B2 * | 8/2009 | Houser et al. | ................... | 280/86.756 |
| 2007/0152417 A1 * | 7/2007 | Ingalls et al. | ................... | 280/86.756 |
| 2011/0068524 A1 * | 3/2011 | McCarthy et al. | ................... | 267/265 |

* cited by examiner

*Primary Examiner* — Paul N. Dickson
*Assistant Examiner* — Barry Gooden, Jr.
(74) *Attorney, Agent, or Firm* — Haugen Law Firm PLLP

(57) ABSTRACT

An apparatus for adjusting wheel alignment at an upper ball joint assembly of a vehicular suspension includes a bushing having an outer surface defined about a first axis, and a receptacle defined about a second axis eccentric to the first axis. The apparatus further includes a locking key having an arm portion adapted to removably cooperate with selected ones of slots arranged radially in a flange portion of the bushing so as to retain the bushing in a predetermined position.

20 Claims, 6 Drawing Sheets

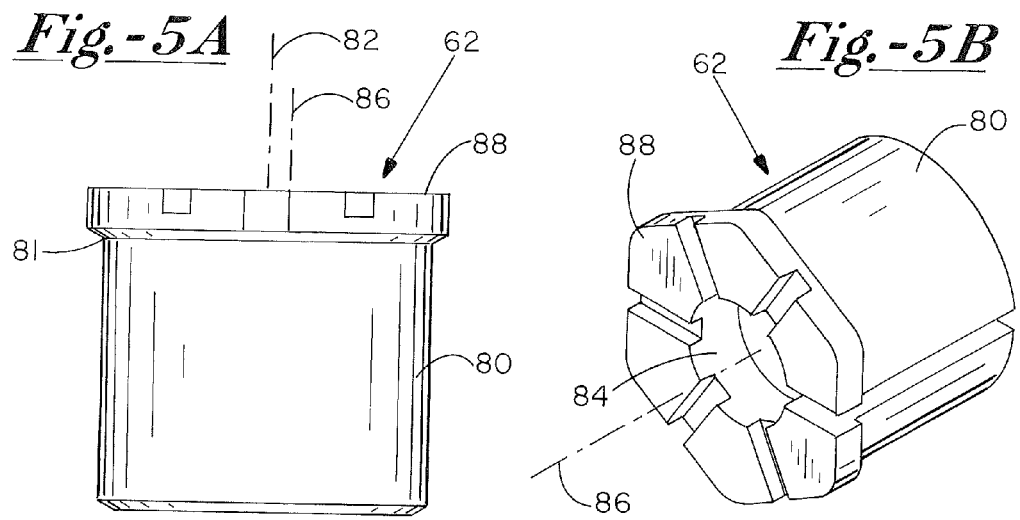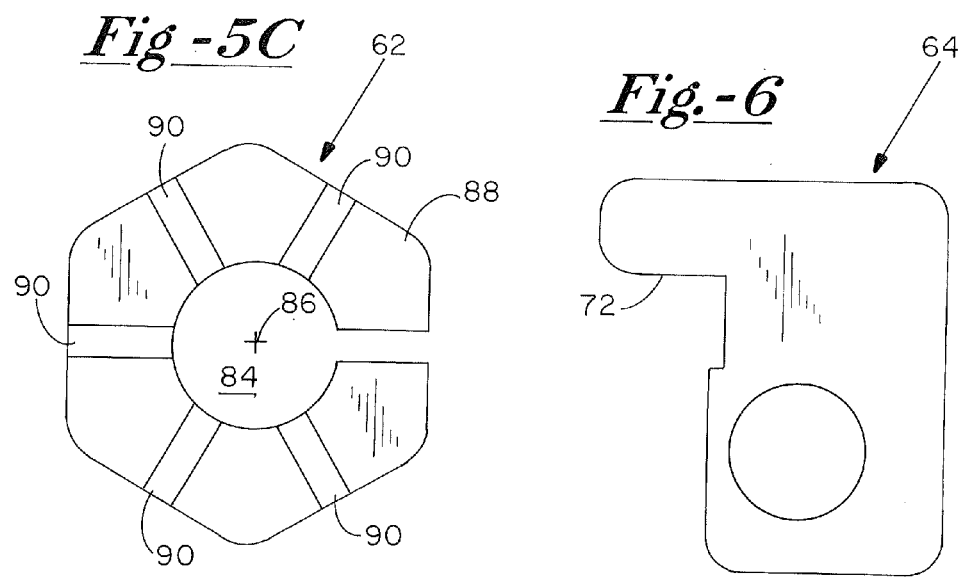

WHEEL ALIGNMENT APPARATUS

CROSS-REFERENCE TO RELATED APPLICATIONS

This application claims priority to U.S. provisional patent application Ser. No. 61/103,072, filed on Oct. 6, 2008 and entitled "Wheel Alignment Apparatus", the content of which being incorporated herein in its entirety.

FIELD OF THE INVENTION

The present invention relates to vehicular suspension systems generally, and more particularly to an apparatus for adjusting wheel alignment at an upper ball joint assembly of a vehicular suspension.

BACKGROUND OF THE INVENTION

Vehicular wheels are often times mounted to a suspension arrangement which involves a spindle or steering knuckle that is configured to engage with upper and lower ball joint assemblies of a suspension control arm. Due to the multiple-point connectivity of the control arm to the steering knuckle, manipulation of the orientation of the upper portion of the control arm relative to the lower portion thereof acts to modify the wheel orientation relative to the vehicular frame. Such wheel orientations are known as camber and caster.

Wheel alignment adjustment in such suspension systems may be accomplished through a variety of methods and mechanisms. A common example mechanism involves eccentric devices, such as offset ball joints and offset bushings at one or more of the ball joint shafts. Caster/camber modifications may be effectuated through rotation of such eccentric devices, which relatively reposition the upper and lower ball joints.

An example conventional ball joint bushing used in connection with pinch bolt-type axle arm connections at the upper ball joint is illustrated in FIG. 1, wherein upper ball joint 10 includes a ball joint stud 12 extending up from steering knuckle 14. Upper control arm 16 includes a pinch bolt securement arrangement, wherein coupling end 18 of upper control arm 16 includes a slot 20 that may be operably compressed by bolt 22 extending through coupling end 18 of upper control arm 16. The conventional arrangement of FIG. 1 includes a ball joint bushing 24 having a central bore 26 through which ball joint stud 12 is operably inserted. Bore 26 may or may not be eccentric to a longitudinal axis defined by bushing 24.

An isolation view of bushing 24 is illustrated in FIG. 2, wherein tab 28 is clearly visible radially extending from bushing 24. Tab 28 is typically integrally formed with bushing 24, and is therefore immovable with respect to bushing 24. As shown in FIG. 1, tab 28 is configured to be at least partially received in slot 20 of coupling end 18. As such, tab 28, as well as the integrally connected bushing 24, may be secured to coupling end 18 of upper control arm 16 through compression of slot 20 by the actuation of bolt 22. Compression of slot 20 frictionally secures tab 28 between the opposed faces of coupling end 18 defining slot 20, and such frictional securement correspondingly secures bushing 24 about ball joint stud 12. Tab 28 may include a recess portion 29 through which bolt 22 may operably extend.

Because of the integral relationship described above between tab 28 and bushing 24, wheel alignment is limited to the one position afforded through the orientation of bushing 24 when tab 28 is positioned in slot 20. In some cases, vehicular modifications are made which necessitate adjustment to original wheel alignment. Such vehicular modifications include suspension changes and changes to the vehicle itself, such as modifying origination chassis arrangement to serve specific purposes. Such chassis modifications may include, for example, ambulance, utility truck, and conversion packages which significantly alter the weight distribution upon the chassis, and can thereby alter wheel alignment out of desired specifications. One solution for adjusting wheel alignment back within desired specifications has involved the use of replacement ball joint bushings, such as that illustrated in FIG. 3. Typically, conventional replacement ball joint bushings 40 do not have a tab extending radially therefrom, such as tab 28 in bushing 24, and instead are merely held in place within aperture 21 of coupling end 18 through the compressive action provided by bolt 22. The lack of a tab, such as tab 28, at bushing 40 enables various camber and caster adjustments to be made simply by rotating bushing 40, with its offset bore 46 about an axis defined by ball joint stud 12. Thus, replacement bushing 40 enables wheel alignment adjustment in various degrees without the need for replacement of the ball joint bushing.

In some cases, however, the lack of a tab extending from bushing 40 can result in displacement over time of the bushing position with respect to ball joint stud 12. Such displacement can include rotational and axial movements. In some cases, such displacement can dislodge bushing 40 out from an installed position in coupling end 18 altogether. Such an occurrence can result in major wheel misalignment, and even unsafe vehicular steering conditions.

In view of the above, therefore, it is a principle object of the present invention to provide an alignment apparatus which enables selective alignment adjustment without disassembly of the ball joint while being retainable in a predetermined secure position.

It is a further object of the present invention to provide a ball joint bushing that can be removably locked in a predetermined alignment position, while also enabling selective further adjustment of wheel alignment, including camber and caster adjustment.

It is a still further object of the present invention to provide a wheel alignment apparatus utilizing a ball joint bushing which is configured for replacement of original vehicular equipment, and which bushing enables secure selective wheel alignment adjustment.

SUMMARY OF THE INVENTION

By means of the present invention, wheel alignment adjustment may be made at an upper ball joint of a vehicular suspension through the use of a selectively repositionable ball joint bushing. Through the arrangement of the present invention, alignment adjustment may be performed without disassembly of the upper ball joint. Specifically, the ball joint bushing incorporates an eccentric bore and a removable locking mechanism which is selectively engagable at various circumaxial positions about a longitudinal axis of the bushing. Rotation of the ball joint bushing about the ball joint stud adjusts wheel alignment as a consequence of the eccentricity of the bushing bore.

In a particular embodiment, the apparatus for adjusting wheel alignment at an upper ball joint assembly of a vehicular suspension includes a bushing having an outer surface defined about a first axis and a receptacle defined about a second axis eccentric to the first axis. The bushing further includes a flange disposed at a first end portion of the bushing, wherein the flange includes a plurality of slots arranged radially about the first axis. The wheel alignment adjustment apparatus further includes a locking key having an arm portion that is adapted to removably cooperate with selected ones of the slots so as to retain the bushing in a predetermined position. The locking key is preferably removably securable to the upper ball joint assembly.

In another embodiment, an apparatus for adjusting wheel alignment at an upper ball joint assembly of a vehicular suspension includes a first element that is mountable about a first axis defined by a ball joint stud of the upper ball joint assembly. The first element includes a first engagement feature and is selectively rotatable about the first axis. The apparatus further includes a second element that is securable to the upper ball joint assembly, and is selectively rotatable about a second axis that is substantially perpendicular to the first axis. The second element also includes a second engagement feature adapted to removably engage with the first engagement feature to secure the first element at a predetermined one of a plurality of circumaxial positions about the first axis.

A method for adjusting wheel alignment at an upper ball joint assembly of a vehicular suspension includes providing an adjustment apparatus having a bushing and a locking element. The bushing includes a first central axis and a first receptacle having a second central axis that is eccentric to the first central axis, and further includes a first engagement feature. The locking element includes a second engagement feature that is adapted to removably engage with the first engagement feature. The method further includes mounting the first receptacle of the bushing at least partially about a ball joint stud of the upper ball joint assembly, and securing the locking element to the upper ball joint assembly about a pivot axis that is substantially perpendicular to the first central axis. The bushing may then be positioned in one of a plurality of pre-defined circumaxial orientations about the second central axis. The first and second engagement features may be engaged to one another by pivoting the locking element about the pivot axis until the second engagement feature comes into an engagement relationship with the first engagement feature in a locking position.

In another embodiment, a vehicular wheel alignment device includes a bushing having a first portion for mounting at least partially about an upper ball joint stud of a vehicular suspension, and a second portion for selective engagement with a locking mechanism. The first portion includes a first receptacle having a first central axis that is eccentric to a second central axis of the bushing. The second portion of the bushing includes a plurality of slots disposed about the second central axis, wherein the slots are configured for removable engagement with the locking mechanism.

BRIEF DESCRIPTION OF THE DRAWINGS

FIG. 5A is an elevation view of the upper ball joint bushing illustrated in FIG. 4;

FIG. 5B is a perspective view of the upper ball joint bushing illustrated in FIGS. 4 and 5A;

FIG. 5C is a top view of the upper ball joint bushing illustrated in FIGS. 5 and 5A-5B;

FIG. 6 is a side elevation view of the locking key illustrated in the upper ball joint assembly of FIG. 4.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various embodiments of the invention. Other embodiments and aspects of the invention are recognized as being within the grasp of those having ordinary skill in the art.

Figure 1:
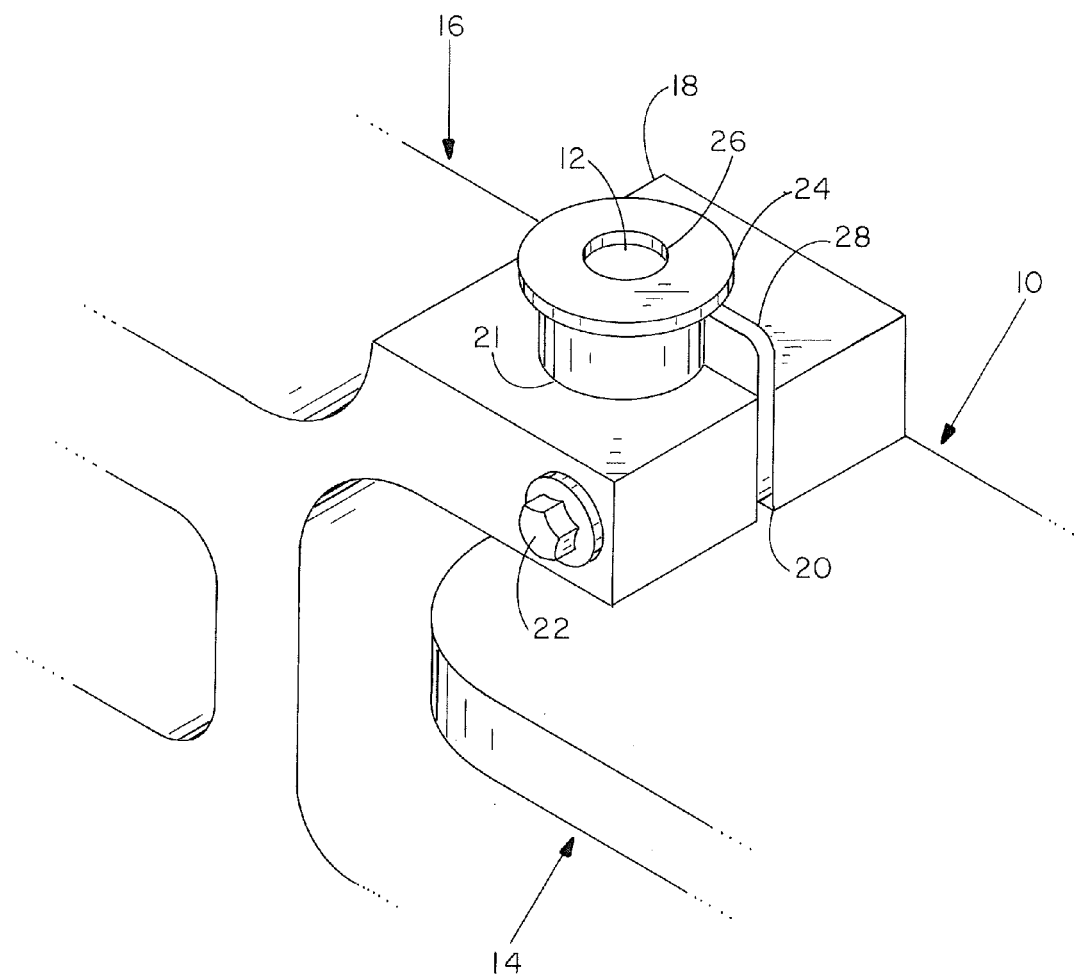
FIG. 1 is a schematic illustration of a conventional upper ball joint assembly.
Figure 2:
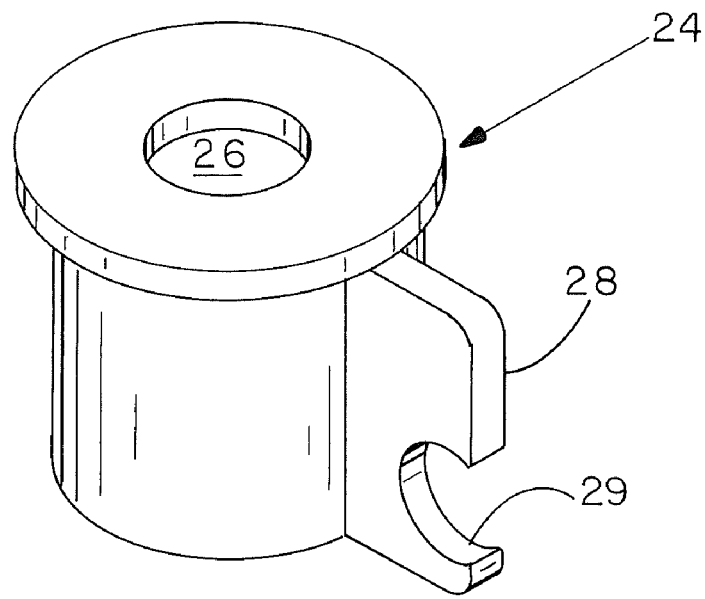
FIG. 2 is an isolation view of a portion of the conventional upper ball joint assembly illustrated in FIG. 1.
Figure 3:
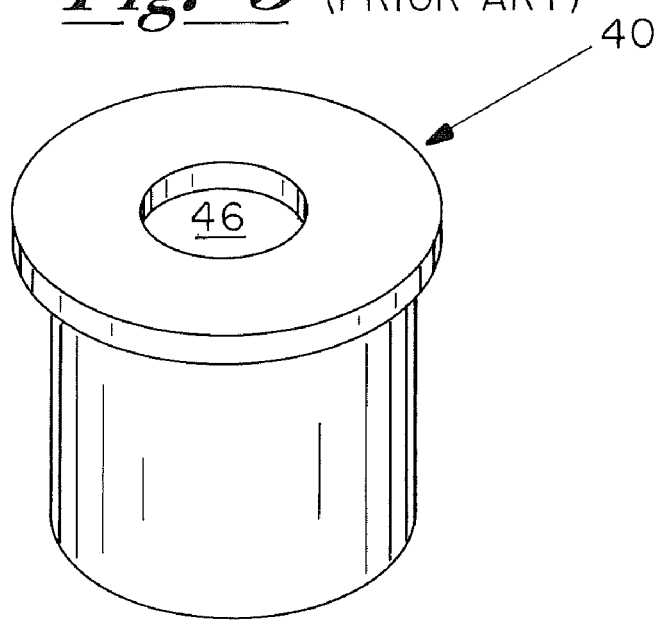
FIG. 3 is an isolation view of a further conventional upper ball joint bushing design.
Figure 4:
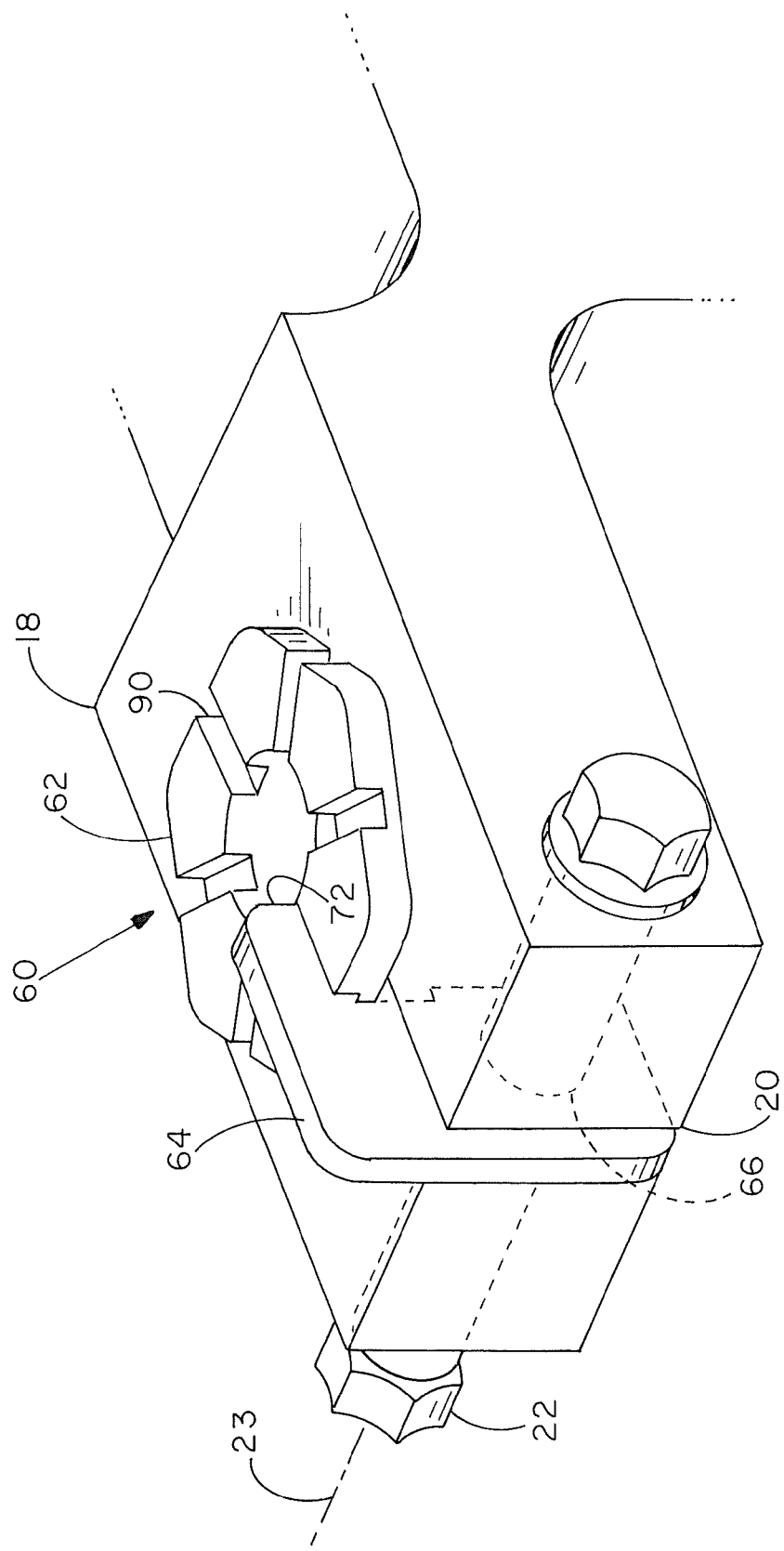
FIG. 4 is a schematic illustration of an upper ball joint arrangement of the present invention.
Figure 7A:
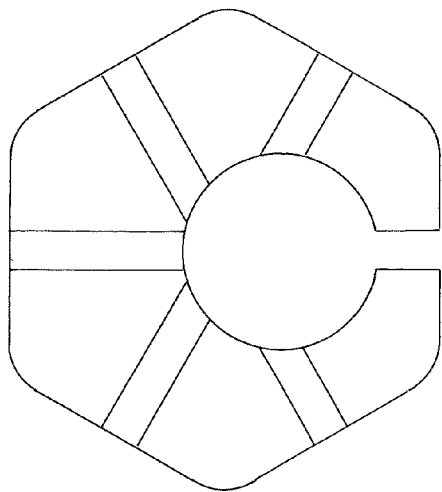
FIGS. 7A-7G are schematic illustrations of the upper ball joint bushing illustrated in FIGS. 4 and 5A-5C in various rotational orientations.
Figure 7B:
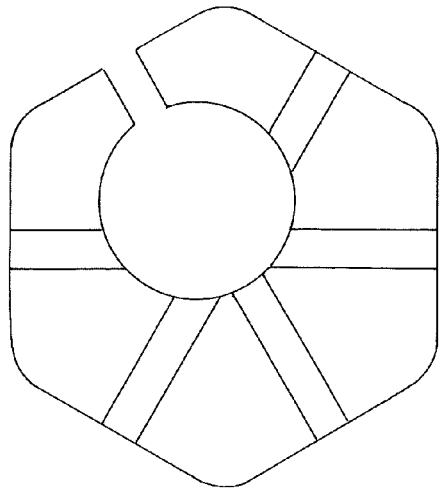
Figure 7C:
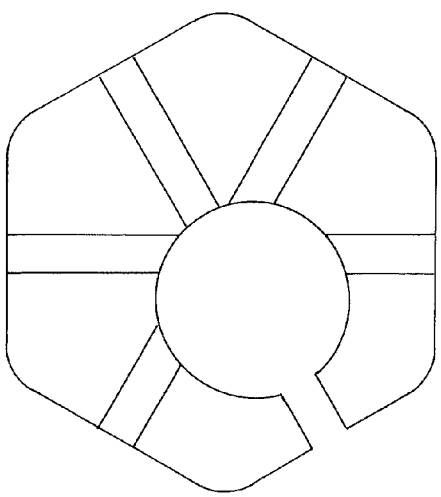
Figure 7D:
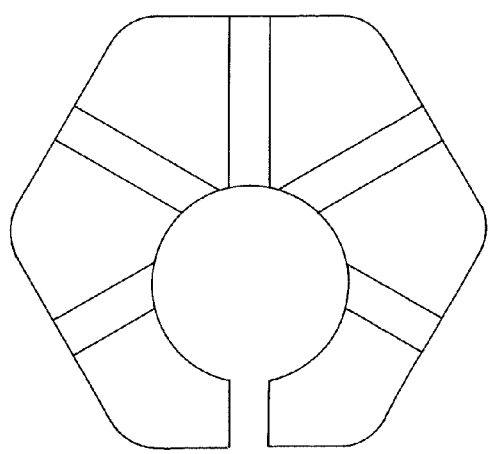
Figure 7E:
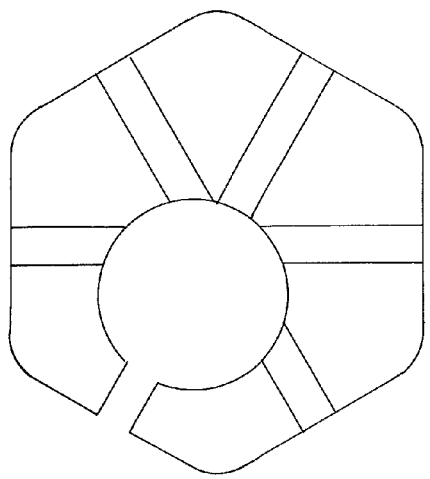
Figure 7F:
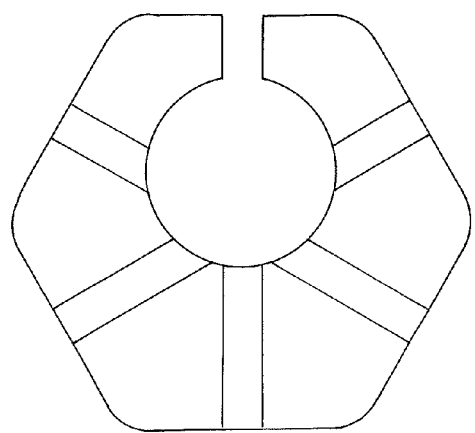
Figure 7G:
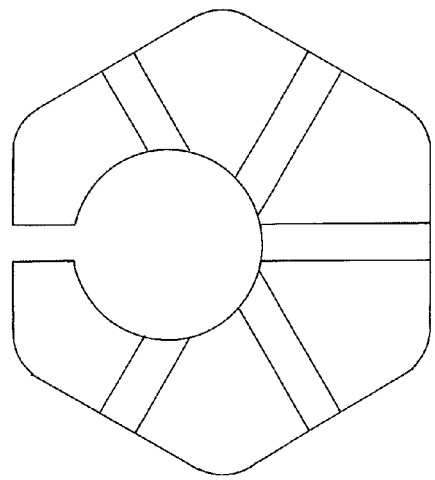

A wheel alignment adjustment apparatus 60 of the present invention is illustrated in FIG. 4, wherein bushing 62 is illustrated as being mounted within aperture 21 of coupling end 18 of upper control arm 16. Alignment adjustment apparatus 60 further includes a locking key 64 that is secured within slot 20 of coupling end 18 by bolt 22. In particular, bolt 22 extends through aperture 66 in locking key 64, whereby locking key 64 is rotatable about bolt axis 23 when not frictionally retained between facing surfaces of coupling end 18 defining slot 20. Moreover, locking key 64 is separate and distinct from bushing 62, and is therefore independently movable with respect to bushing 62.

Bushing 62 is more clearly illustrated in the isolation views of FIGS. 5A-5C, wherein bushing 62 includes an outer surface 80 defined about a first axis 82 extending longitudinally through bushing 62. In some embodiments, outer surface 80 may be substantially cylindrical, though it is contemplated that other shapes complimentary to aperture 21 in coupling end 18 may be useful for bushing 62. Receptacle 84, which may take the form of a bore extending longitudinally through bushing 62, is defined about a second axis 86 that may be eccentric to first axis 82. In some embodiments, second axis 86 is parallel to, but offset from, first axis 82. In other embodiments, second axis 86 may be skewed relative to first axis 82. In still further embodiments, second axis 86 may be both radially offset and skewed relative to first axis 82.

In the parallel offset axis arrangement illustrated in FIGS. 5A-5C, second axis 86 may be offset from first axis 82 by between about 1 and 6 mm. Such an offset axis enables wheel alignment adjustment merely through rotation of bushing 62 about first axis 82 and ball joint stud 12, as is understood in the art. The offset dimensions described above enable camber and caster adjustment of about +/−3°. In a skewed orientation of second axis 86, a +/−3° adjustment may be enabled through angles up to about 12° with respect to first axis 82. Other offset and/or skewed magnitudes for second axis 86, however, are also contemplated by the present invention in order to accommodate greater or lesser extents of wheel alignment adjustment through rotation of bushing 62 about first axis 82.

Bushing 62 further includes a flange 88 disposed at a first end portion 81 of bushing 62. Flange 88 may extend radially outwardly from first axis 82, and includes a plurality of slots or recesses 90 which may also be radially arranged about first axis 82. Other arrangements for slots 90, however, are contemplated by the present invention. Slots 90 may be of any shape, orientation, or dimension which coordinates with arm portion 72 of locking key 64. In particular, arm portion 72 of locking key 64 is adapted to cooperate with selected ones of slots 90 so as to retain bushing 62 in a predetermined circumaxial and axial position about ball joint stud 12. In this manner, arm portion 72 may be selectively engaged with a slot 90 in a locking position in order to secure bushing 62 in a predetermined circumaxial orientation. This predetermined circumaxial of bushing 62 secures a predetermined desired wheel alignment that is facilitated through the offset receptacle 84 in connection with ball joint stud 12. Moreover, the securement of locking key 64 to bolt 22 enables retention of bushing 62 in a predetermined axial position, such that undesired axial displacement of bushing 62 is minimized.

The illustrated embodiment of bushing 62 represents one of many bushing configurations contemplated by the present invention. For example, one or more recesses 90 may be disposed at any portion of bushing 62 that is operably accessable by locking key 64. For example, recesses 90 may be disposed at a first end portion 81 of bushing 62 while not being disposed in flange 88. Moreover, recesses 90 may be disposed at or along outer surface 80 of bushing 62 for selective engagement with locking key 64. In other embodiments, bushing 62 may include one or more protrusions for selective engagement with one or more recesses at locking key 64. Thus, the present invention contemplates any type of selective engagement, including mating engagement between bushing 62 a locking element, such as locking key 64. In some embodiments, the engagement may be effectuated through cooperating protrusions and recesses. In the illustrated embodiment, engaging arm portion 72 of locking key 64 comprises a protrusion that operably cooperates with recesses or slots 90 of bushing 62 to selectively lock bushing 62 in a desired circumaxial and/or axial orientation about ball joint stud 12.

In operation, one embodiment of the invention involves bushing 62 being installed in aperture 21 about ball joint stud 12, and being rotated about first axis 82 so as to provide a desired wheel alignment. Once in the desired circumaxial orientation, bushing 62 may be locked in place, both circumaxially and axially, by engaging arm portion 72 in a respective slot 90. Such engagement may be effectuated by rotating locking key 64 about bolt axis 23. Once such engagement between arm portion 72 and slot 90 is accomplished, bolt 22 is actuated to tightly frictionally secure locking key 64 within slot 20. Such tight securement prevents rotational movement of locking key 64 about bolt axis 23, and correspondingly maintains engagement of arm portion 72 in slot 90.

In the event that wheel alignment requires further adjustment, bolt 22 can be loosened to enable disengagement of locking key 64 from slot 90, such that bushing 62 may be rotated to effectuate wheel alignment adjustment. Securement of bushing 62 in the new position is performed as described above. While the removably locking engagement described above involves an arm portion 72 of locking key 64 engaging with slots 90 in bushing 62, it is contemplated that various configurations and modifications to the illustrated embodiment may be made without departing from the spirit and scope of the present invention.

FIGS. 7A-7G are representative of various wheel alignment adjustment positions for bushing 62. For the purposes of the top views of FIGS. 7A-7G, the top of each drawing represents the frontward direction of the vehicle, wherein alignment adjustment is being performed to the left front wheel. The following table sets forth camber/caster adjustment for each figure relative to a "zero" position of ball joint stud 12, which is represented by the center point of flange 88.

| Figure | Camber (+/−) | Caster (+/−) |
|---|---|---|
| 7A | − | |
| 7B | + | − |
| 7C | − | + |
| 7D | | + |
| 7E | + | + |
| 7F | | − |
| 7G | + | |

The illustrated embodiment demonstrates six adjustment locations as a consequence of six slots 90. It is contemplated that greater or fewer adjustment increments may be provided by alignment adjustment apparatus 60. Moreover, varying amounts of eccentricity of second axis 86 with respect to first axis 82 is contemplated by the present invention to provide greater or less than +/−3° or camber/caster adjustment.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different methods/devices and that various modifications can be accomplished without departing from the scope of the invention itself.

What is claimed is:

1. A vehicular wheel alignment device, comprising:
a bushing having a first portion for mounting at least partially about an upper ball joint stud of a vehicular suspension, and a second portion for selective engagement with a locking mechanism, said first portion including a first receptacle having a first central axis that is eccentric to a second central axis of said bushing, said second portion of said bushing including a plurality of slots disposed about said second central axis, said plurality of slots being configured for removable engagement with said locking mechanism.

2. A vehicular wheel alignment device as in claim 1 wherein said second portion includes a flange extending radially outwardly from a first end portion of said bushing.

3. An apparatus for adjusting wheel alignment at an upper ball joint assembly of a vehicular suspension, said apparatus comprising:
(a) a bushing having:
(i) an outer surface defined about a first axis;
(ii) a receptacle defined about a second axis eccentric to said first axis; and
(iii) a flange disposed at a first end portion of said bushing, said flange including a plurality of slots arranged radially about said first axis;
(b) a locking key having an arm portion adapted to selectively and removably cooperate with any one of said plurality of slots so as to retain said bushing in a predetermined position, said locking key being removably securable to said upper ball joint assembly.

4. An apparatus as in claim 3 wherein said outer surface of said bushing is substantially cylindrical.

5. An apparatus as in claim 3 wherein said receptacle is a bore extending through said bushing.

6. An apparatus as in claim 3 wherein said flange is hexagonal.

7. An apparatus as in claim 3 wherein said second axis is parallel to, but offset from said first axis.

8. An apparatus as in claim 5 wherein said second axis is offset by between 1 and 6 mm from said first axis.

9. An apparatus for adjusting wheel alignment at an upper ball joint assembly of a vehicular suspension, said apparatus comprising:
   (a) a first element mountable about a first axis defined by a ball joint stud of the upper ball joint assembly, said first element having a first engagement feature and being selectively rotatable about said first axis; and
   (b) a second element securable to the upper ball joint assembly and selectively rotatable about a second axis that is substantially perpendicular to said first axis, said second element having a second engagement feature adapted to removably engage with said first engagement feature to secure said first element at a predetermined one of a plurality of circumaxial positions about said first axis.

10. An apparatus as in claim 9 wherein an outer surface of said first element defines a central second axis that is eccentric to said first axis.

11. An apparatus as in claim 9 wherein said first engagement feature includes a plurality of recesses.

12. An apparatus as in claim 11 wherein said second engagement feature is a locking key.

13. A method for adjusting wheel alignment at an upper ball joint assembly of a vehicular suspension, said method comprising:
   (a) providing an adjustment apparatus, comprising:
      (i) a bushing having a first central axis and a first receptacle having a second central axis that is eccentric to said first central axis, said bushing further including a first engagement feature; and
      (ii) a locking element having a second engagement feature adapted to removably engage with said first engagement feature;
   (b) mounting said first receptacle of said bushing at least partially about a ball joint stud of the upper ball joint assembly;
   (c) securing said locking element to the upper ball joint assembly about a pivot axis that is substantially perpendicular to said first central axis;
   (d) positioning said bushing in one of a plurality of pre-defined circumaxial orientations about said second central axis; and
   (e) engaging said first and second engagement features to one another by pivoting said locking element about said pivot axis until said second engagement feature comes into an engagement relationship with said first engagement feature in a locking position.

14. A method as in claim 13, including securing said locking element in said locking position.

15. A method as in claim 13 wherein said second engagement feature includes an arm portion.

16. A method as in claim 15 wherein said first engagement feature includes a plurality of recesses.

17. A method as in claim 16 wherein said arm portion is cooperative with any one of said plurality of recesses.

18. A method as in claim 16 wherein said plurality of recesses are disposed in a flange extending radially outwardly at a first end portion of said bushing.

19. A method as in claim 18 wherein said flange defines a hexagonal shape about said bushing.

20. A method as in claim 14, including:
   (w) loosening said locking element from said locking position;
   (x) pivoting said locking element about said pivot axis such that said second engagement feature disengages from said first engagement feature;
   (y) rotating said bushing about said second central axis to a different one of said plurality of pre-defined circumaxial orientations about said second central axis; and
   (z) repeating step (e).

\* \* \* \* \*